United States Patent [19]

Hatton et al.

[11] Patent Number: 4,714,140
[45] Date of Patent: Dec. 22, 1987

[54] MULTI-AXIS ARTICULATED ALL TERRAIN VEHICLE

[76] Inventors: John H. Hatton, 5275 Craner Ave., North Hollywood, Calif. 91601; Gregory L. Batt, #2 8741 Montcalm Street, Vancouver, British Columbia, Canada, V6; 4R1

[21] Appl. No.: 840,591
[22] Filed: Mar. 17, 1986
[51] Int. Cl.⁴ .............................................. B62D 57/02
[52] U.S. Cl. ..................... 180/20; 180/167; 180/9.32; 280/6 H; 280/442
[58] Field of Search ............... 180/20, 167, 9.32, 209, 180/210; 318/113; 343/465; 280/6 R, 6 H, 442, 492, 5.28, 80 R

[56] References Cited
U.S. PATENT DOCUMENTS

2,510,817  6/1950  Greiner et al. ..................... 180/20
3,606,957  9/1971  Fuzzell ............................. 180/167
3,680,878  8/1972  Beck ................................ 280/6 H
3,842,926 10/1974  Williams .......................... 280/6 H
4,109,742  8/1976  Fairchild et al. .................. 180/20

Primary Examiner—John J. Love
Assistant Examiner—Donn McGiehan
Attorney, Agent, or Firm—Baker, Maxham & Jester

[57] ABSTRACT

A remote controlled multi-axis all terrain vehicle includes front and rear lugged driving wheels, with front and rear wheels steerable about a vertical axis, and pivotal about a longitudinal axis of the vehicle. The vcehicle is remotely controlled and includes hydrostatic drive for the wheels of the vehicle. A level control system includes level sensing instruments and controls for automatically leveling the frame of the vehicle for up to thirty-five degree slopes.

16 Claims, 17 Drawing Figures

MULTI-AXIS ARTICULATED ALL TERRAIN VEHICLE

BACKGROUND OF THE INVENTION

The present invention relates to motor vehicles and pertains particularly to a remotely controlled all terrain motor vehicle.

There exists a need for vehicles that can operate on rough terrain and on steep slopes. Such vehicles are needed for numerous tasks. These include the hauling of tools, equipment, and other articles of commerce.

There is also a need for vehicles of this type that can carry out various operations on steep slopes and in remote locations. Such vehicles could carry out logging operations, re-foresting and similar operations. Other operations could include seeding, planting, soil and erosion control and fire fighting operations.

There also exists a need for vehicles that can be remotely operated on steep slopes and in hazardous areas, These vehicles would carry out many of the above operations by an operator through remote control from a safe location.

A number of vehicles have been developed for rough terrain, such as those developed for the military. These, however, are not suitable for the aforementioned operations. The following patents are exemplary of the prior art approach to some vehicles of this type:

U. S. Pat. Nos. 146,224, 621,634, 1,059,498, 1,231,352, 2,959,201, 3,675,724, 3,724,554, 3,762,478.

U.S. Pat. Nos. 3,785,564 3,889,759 4,343,513 4,366,877, 4,482,960, 4,519,460, 4,549,610, 4,560,010.

None of these are suitable for the requirements pointed out above.

SUMMARY AND OBJECTS OF THE INVENTION

It is the primary object of the present invention to provide an improved all terrain vehicle.

In accordance with a primary aspect of the present invention, a vehicle includes at least one roller type wheel having traction means, at least one steerable wheel, and remote control means for controlling the vehicle from a remote location.

Other aspects of the invention include means for maintaining a load carrying a platform substantially level for certain maximum slopes, and means for tilting at least one of the wheels of the vehicle about a horizontal axis.

BRIEF DESCRIPTION OF THE DRAWINGS

The above and other objects and advantages of the invention will become apparent from the following description when read in conjunction with the accompanying drawings wherein.

DETAILED DESCRIPTION OF PREFERRED EMBODIMENTS

Figure 1:
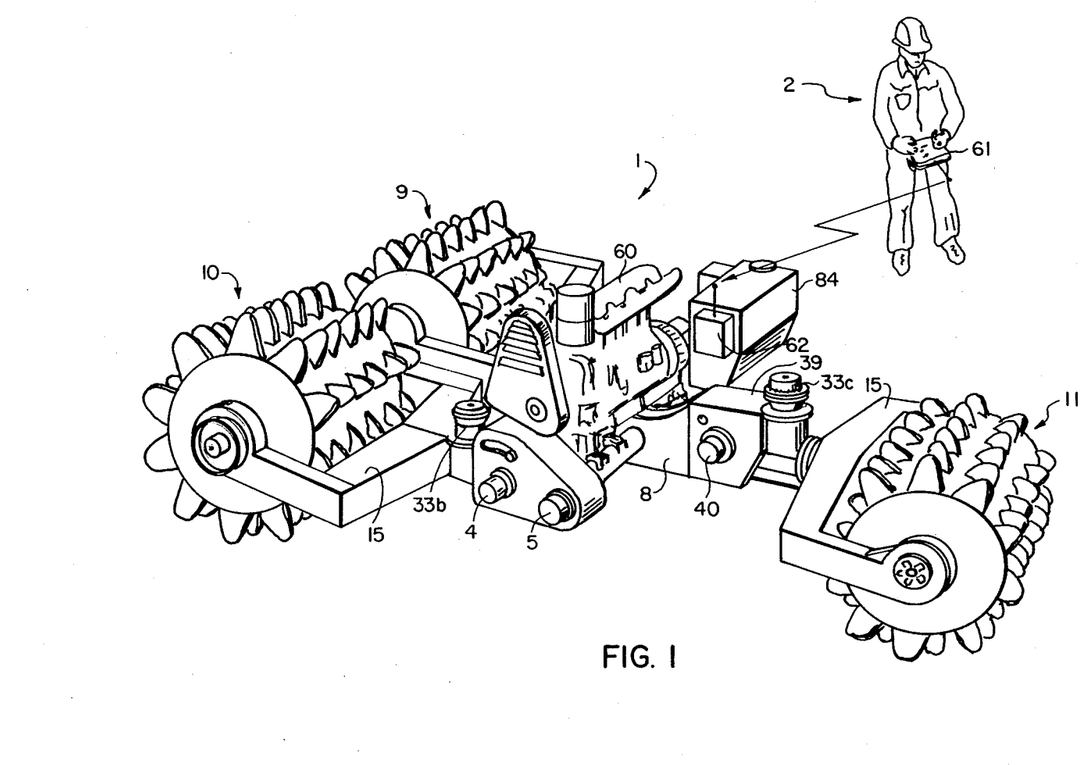
FIG. 1 is a perspective view of a preferred embodiment of the invention.

Referring particularly to FIG. 1 of the drawing, an exemplary embodiment of a motor vehicle in accordance with the invention is illustrated. The vehicle, designated generally by the numeral 1, is being operated remotely by an operator designated generally by the numeral 2. The vehicle 1 is designed to climb, descend and traverse slopes of up to a one-to-one gradient, remaining stable with no tendency of the drive wheel slipping or the vehicle tipping when in the transverse mode. The vehicle is designed to as act a transport vehicle for carrying cargo, or as a tractor vehicle for towing or carrying implements for carrying out operations on a slope or the like.

Figure 2:
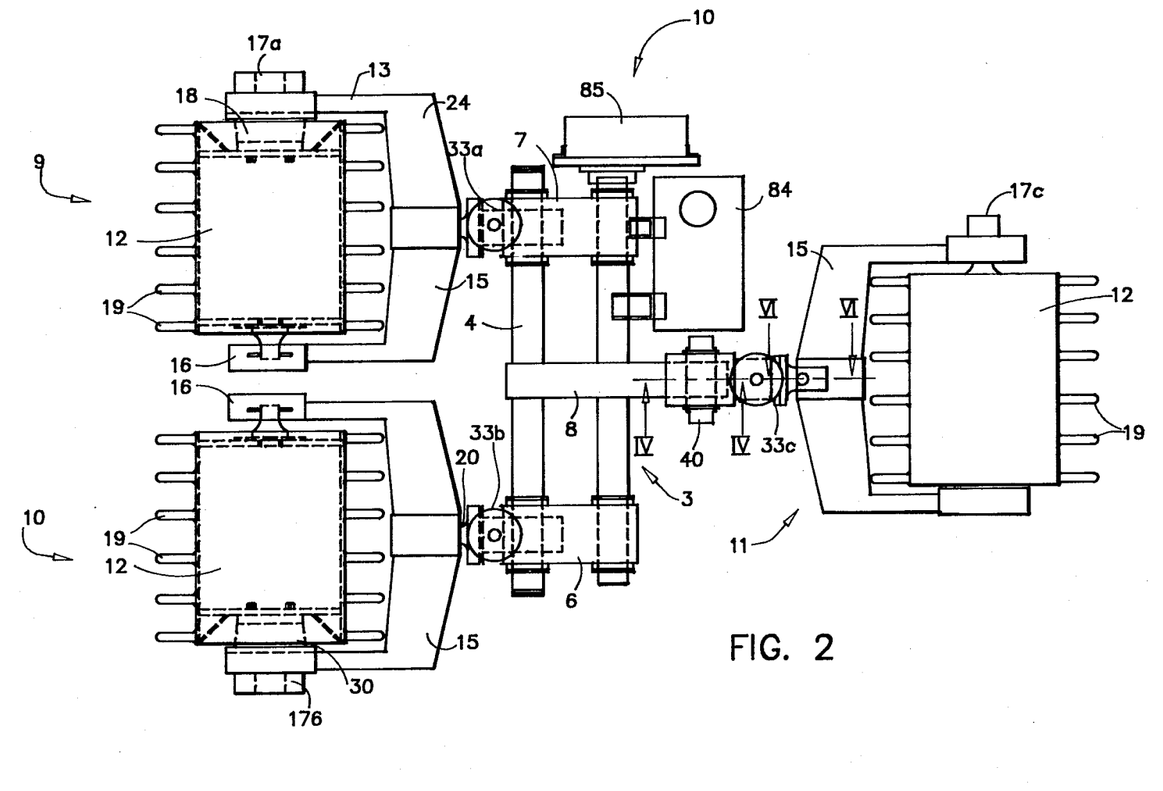
FIG. 2 is a top elevation view of the embodiment of FIG. 1.
Figure 3:
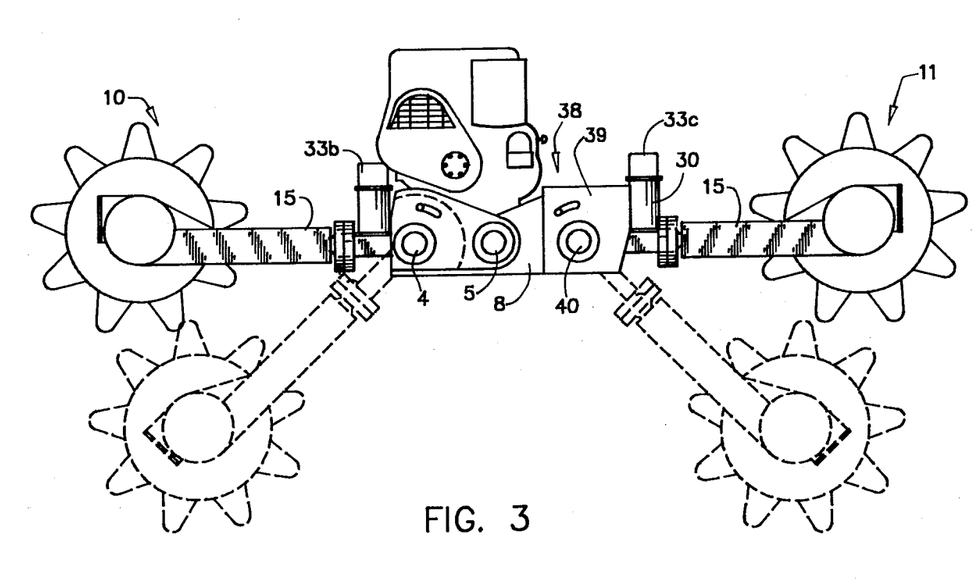
FIG. 3 is a side elevation view of the embodiment of FIG. 1.

Referring to FIGS. 2 and 3, the vehicle 1 comprises a main frame 3 having a generally rectangular configuration, as shown in FIG. 2, with a pair of parallel transverse frame members 4 and 5 connected at the side ends by box beam members 6 and 7. The engine is omitted from FIG. 2 to show the frame structure. A central beam member 8 extends along the longitudinal axis of the frame toward the rear and terminates at the rear end of the vehicle for the mounting of a wheel assembly, as will be explained. The frame has a front end to which is mounted a pair of front wheel assemblies, designated generally by the numerals 9 and 10, that are substantially identical in configuration. The frame includes a rear end at the terminus of beam 8 on which it is mounted a rear wheel assembly 11 having a single rear wheel.

The wheel assemblies 9, 10, and 11 of the vehicle are identical in structure and a single one will be described in detail with the same reference numeral applying to the same or identical parts. The wheel assemblies of the vehicle comprises identical wheels 12, which in the illustrated embodiment are in the general form of cylindrical drums having a plurality of radial teeth or lugs 19. The wheels are each rotatably mounted in a yoke comprising parallel arms 13 and 14 extending forward of a yoke cross member 15. The wheels 12 are rotatably mounted in suitable bearigs or journals 16 on the inboard side of the yoke and are journaled by a drive assembly comprising a hydraulic motor 17 and planetary gear drive assembly 18 on the outboard side thereof. The wheels 12 preferably have an axial length that exceeds the diameter thereof, and while radially extending lugs are illustrated, the wheels may have rubber tires for certain applications, as will be subsequently explained.

The wheel assemblies are each mounted for steering and for swiveling to a limited extent about a longitudinal axis. Referring to FIG. 2, each wheel assembly is mounted for turning about a vertical axis and includes a steering motor 33. Steering motors 33a and 33b control steering of the front wheels, and motor 33c controls steering of the rear wheel. The motors are coordinated and synchronized as will be explained.

Figures 6, 7:
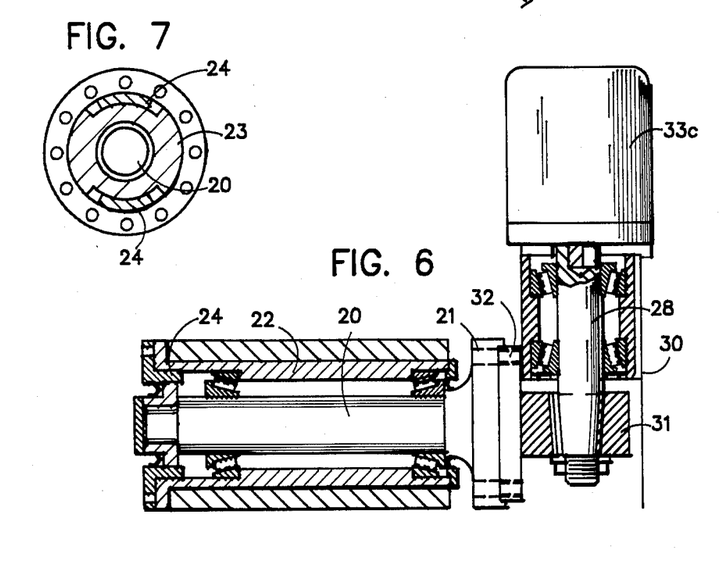
FIG. 6 is a section view taken on line VI—VI of FIG. 2.
FIG. 7 is a section view taken on line VII—VII of FIG. 6.

Referring to FIGS. 4–7, details of the steering and swivel mounts are illustrated. The yoke members 15 of the wheel assemblies are journaled on a shaft 20, which is detachably attached by a coupling flange 21 to a steering assembly attached to the central frame 8 as shown in FIG. 6. The yoke cross member 15 is rotatably mounted by means of a bearing assembly mounted within a tubular member 22 secured as by welding or other suitable means on the member 15 at the center or pivot axis thereof. This swivel assembly includes stop limiting means in the form of a key shaped plate 23 secured on the end of shaft 20, forming a pair of arcuate slots 25 and 26 with the walls of tubular member 22. A pair of segments 24 mounted to and extending into the end of tubular member 22 oscillates therewith and engages the ends of the slots 25 and 26 formed by the plate. This limits the movement of the yoke about its swivel axis and shaft 20. This journal or shaft 20 extends horizontally parallel to the longitudinal axis of the vehicle frame. The journals are constructed to permit or provide a limited amount of pivotal movement about the axis thereof, such as about thirty degrees for example to each side of the horizontal.

The rear wheel assembly and the front wheel assemblies are identical and similarly mounted for limited horizontal rotational movement. This overall arrangement of both front and rear pivoting and steering permits the vehicle to turn in a very small radius and gives it very high maneuverability.

The limited pivotal movement of the wheel assemblies permits the wheels to pivot in accordance with the support terrain to maintain maximum contact with the surface of the terrain and yet restrains it from flipping over if a deep depression or the like is encountered. Thus, the vehicle is highly flexible and stable as well as highly maneuverable.

The wheels, as illustrated, are in the form of drums with lugs for penetrating the soil for obtaining traction and also are designed in the illustrated embodiment to serve as punchers to punch straw and the like into the soil.

Figures 4, 5:
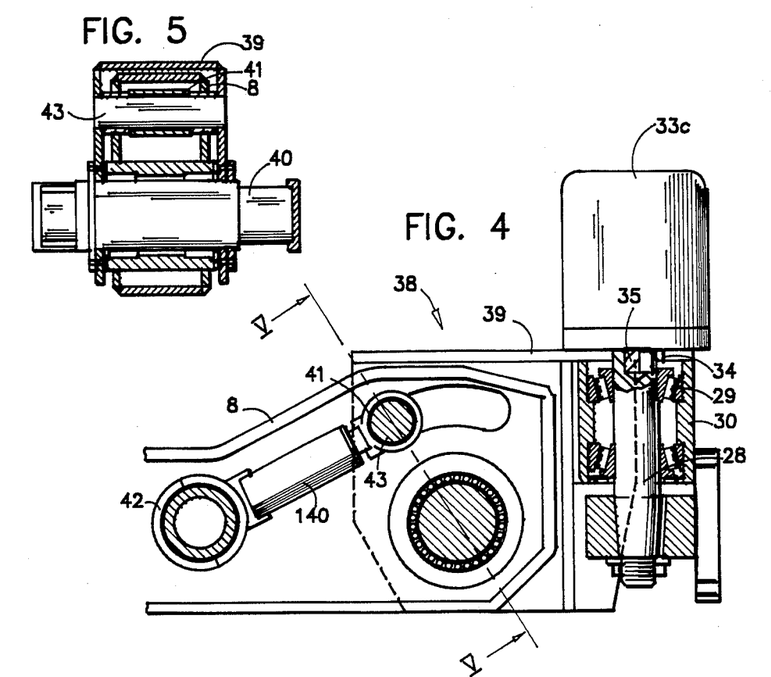
FIG. 4 is a section view taken on line IV—IV of FIG. 2.
FIG. 5 is a section view taken on line V—V of FIG. 4.

Just aft of the horizontal pivotal joint or shaft is a steering assembly which mounts the yoke assembly for steering movement about a vertical axis for steering the vehicle. The rear steering assembly is shown in FIG. 4 and comprises a king pin 28 mounted in a bearing assembly 29 in a tubular member 30 mounted on a pivotable housing 39 mounted on the end of member 8 of the vehicle frame. A steering bracket 31 is secured to the lower end of the king pin 28 and includes a coupling flange 32 for connecting to flange 21 of the swivel assembly. A hydraulic motor 33c of an oscillating shaft type has a hollow shaft 34, which couples by a spline or key to the upper end 35 of the king pin 28. The motor 33c is actuated for steering of the rear wheel of the vehicle. The hydraulic motor 33 may be any suitable type, such as those known or identified as the HS Series Rotary Actuators manufactured and available from Bird-Johnson Company. These are vane motors with up to two-hundred and eighty degree total shaft travel, which provides ample rotation for steering of the vehicle.

Referring to FIG. 3 of the drawings, further articulation of the wheel assemblies is illustrated wherein the wheel assemblies pivot downward for elevating the vehicle frame. As shown in FIG. 3, the wheel assemblies are mounted to pivot downward about a horizontal axis transverse to the axis of the vehicle. This feature comprises an elevating mechanism 38, substantially as shown in FIG. 4, for each of the wheel assemblies. The rear elevating mechanism comprises a housing 39 which overlaps and is pivotally connected to the end of frame member 8 by a pivot pin or shaft 40. The shaft 40 is rotatably mounted in a bearing assembly as shown mounted in beam 8 and is secured to the side, walls of the housing 39 in a suitable manner for rotation therewith.

The elevating mechanism comprises a hydraulic ram 140 having one end 42 rotatably mounted on a cylindrical journal such as on tubular frame member 5. The other end of the ram is rotatably connected to a pin 43 acting as a crank pin mounted in the side walls of housing member 39. The pin 43 extends through slots 44 in the sides of the beam 8. These slots also act as stop limiting means. The ram 140 is actuated for application of a force for pivoting the housing 39 relative to frame member 8 and thereby pivots the wheel assembly about the elevating axis. Hydraulic liquid under control of the vehicle level control system activates the hydraulic motor to pivot the wheel assembly about its support axis. The vehicle can have both front and rear elevating assemblies as illustrated or can have a single front or rear elevating assembly.

This elevating assembly enables the vehicle to enter slopes of up to one-to-one gradient while keeping the support platform mounted on the frame thereof in a close to level condition. Slope sensors in the control system sense the gradient of the slope and selectively operate the elevating mechanisms as needed to level the main frame of the vehicle.

The vehicle is powered by a suitable engine 60, such as an internal combustion engine. It may also be powered by other suitable motors or engines, such as electric motors or gas turbines or the like. This engine drives a hydraulic pump for a hydraulic system that supplies pressurized hydraulic fluid for the various motors that control the various movements of the vehicle. The engine is preferably provided with a deep sump for containing adequate oil supply even when the vehicle and engine is tilted up to forty-five degrees.

The orientation of the vehicle is such that the front is considered to the left, as viewed in FIG. 1, such that the two wheels are in front of the vehicle with a single trailing wheel being to the rear. The illustrated vehicle has both front and rear wheels steerable. However, it may be constructed so that only one of the front and the rear wheel is steerable.

The vehicle is designed to carry out numerous operations on rough terrain. The operations can be carried out, preferably in a remote fashion. The vehicle is designed to climb, descend and traverse very steep slopes while at the same time maintaining a support platform thereon in a relatively stable or level position.

Figure 8:
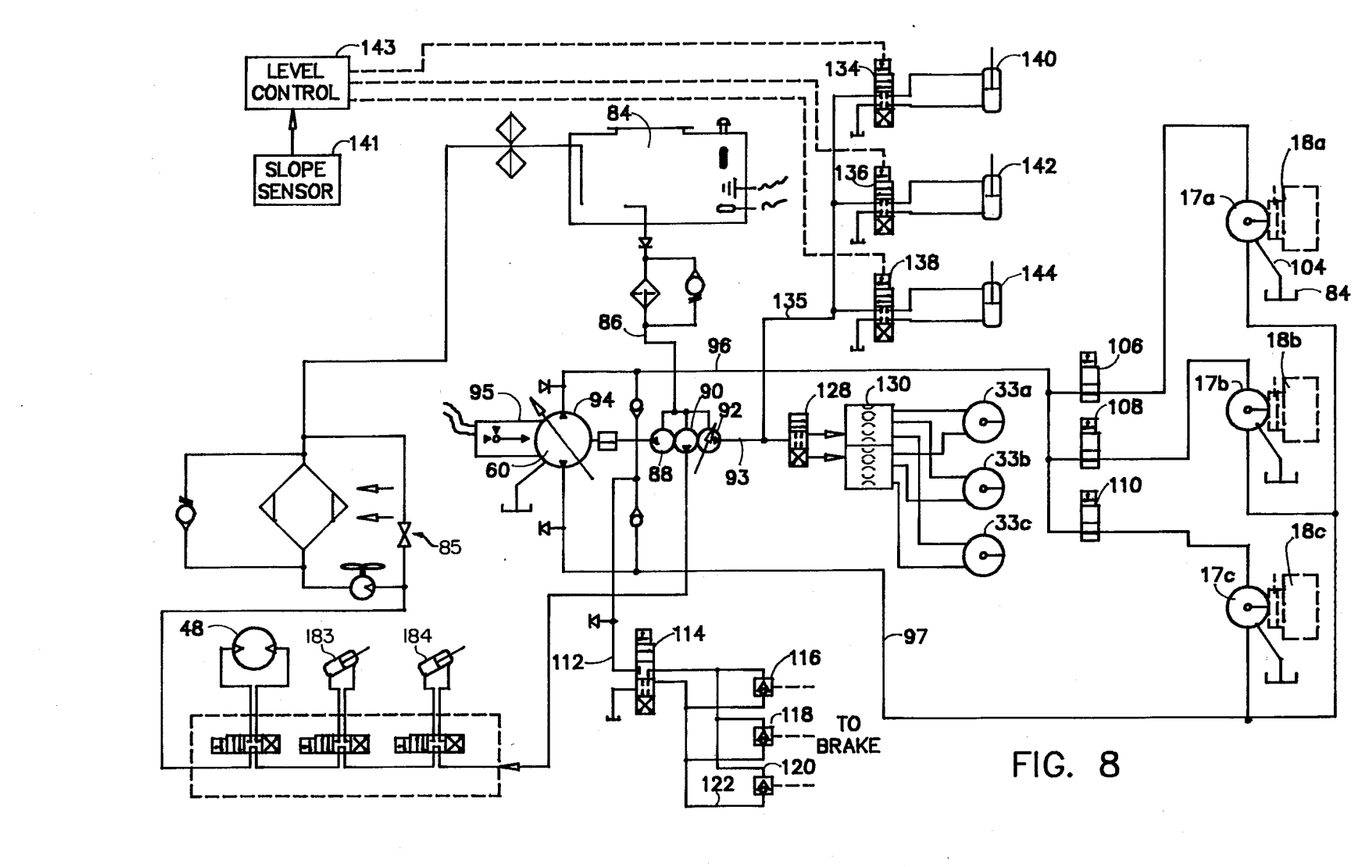
FIG. 8 is a schematic illustration of a typical hydraulic system for the vehicle of FIG. 1.
Figure 9:
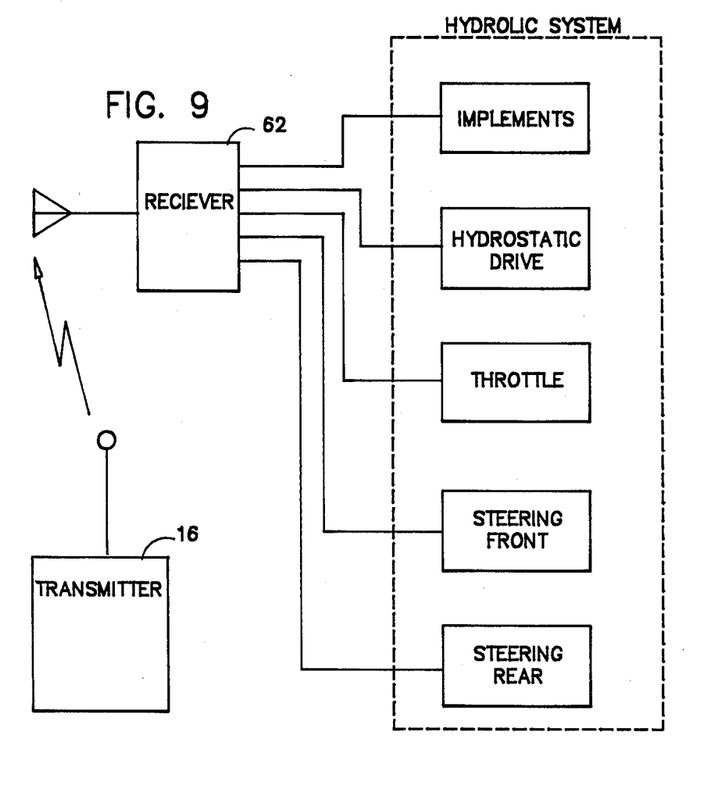
FIG. 9 is a schematic illustration of a typical remote control system for the vehicle.

The vehicle is powered and controlled by a hydraulic system, which is schematically illustrated in FIG. 8, for example. The vehicle is remotely controlled by means of a radio control system, as shown in FIG. 9 and will be subsequently explained. With particular reference to FIG. 8, an exemplary hydraulic circuit for the vehicle is illustrated.

The exemplary circuit comprises a sump or reservoir 84 from which hydraulic fluid or oil is drawn for operation of the various hydraulic circuits and motors within the system. The sump may also act as a cooler for the oil supply and may have sensing instruments and the like for sensing the temperature thereof. However, the system preferably has an oil cooler designated generally by the numeral 85.

The fluid from the reservoir is supplied or drawn by way of a line 86 by a series of pumps, for example that include a charging pump 88, an accessory pump 90 for supplying pressurized fluid for operation of implements, and a variable demand pump 92 for supplying fluid to the leveling and steering circuit of the vehicle. The variable demand pump 92 may be, for example, a variable displacement pump with controls responsive to demand that automatically changes the displacement from zero flow at no demand to sufficient flow to meet demand. Such pump controls are known and available and do not themselves form a part of this invention.

The charging pump 88 supplies fluid to a variable displacement primary pump 94, which supplies high pressure fluid primarily for the powering of the translation motors of the vehicle. This pump 94 is a variable displacement, such as an axial piston swash plate pump, such as available from Sunstrand Corporation, with the wheel drive units being preferably fixed displacement motors with planetary gear drive units, similarly available from the Sunstrand Corporation. Systems are available including combination of variable displacement pump and fixed displacement motors in the form of hydrostatic transmissions, such as disclosed in Sunstrand bulletins 9521!-A through 9522!-A, incorporated herein by reference.

The swash plate of the pump 94 is controlled by a servo which is normally biased to a zero displacement position. The servo is controlled by the radio transmitter to advance it to a displacement position. If the remote control fails, the servo will automatically move the swash plate to a zero displacement position.

The high pressure side of the pump 94 supplies pressurized oil or fluid by way of high pressure line 96 through throttling valves 106, 108, and 110 to the three main drive motors 17 of the vehicle. The return fluid from the pumps return by return line 97 to the sump or tank 84. The pump 94 and motors 17a–c are in a closed circuit with any fluid loss made up charging pump 88.

The plurality of throttling valves 106, 108 and 110 are available for controlling the high pressure fluid to the motors 17a, 17b, and 17c for a form of speed control, braking and coordinated utilization for steering of the vehicle. These valves are controlled by the electrical interface such as by solenoids or the like of the remote control system. Normal braking, however, is accomplished through hydrostatic braking through the hydrostatic drive. For example, should the vehicle try to overrun, the motors 17a–c act as pumps, and pump 94 acts as a motor to resist higher fluid flow.

The vehicle is preferably provided with a fail safe brake system, with, for example, disc brakes that are automatically spring applied and pressure released by means of hydraulic pressure. Therefore, should the hydraulic pressure of the system fail, the brakes automatically apply and stop the vehicle.

The brake system includes a supply line 112 supplying the fluid through a spool valve 114 to the respective brake release pistons 116, 118 and 120. As the vehicle is powered up and the charging pump begins to supply make-up fluid to the main pump 90, it also supplies fluid to the brake valve 114. As the vehicle begins to get under way, the valve 114 is shifted to supply fluid for release of the brakes to enable the vehicle to move.

In the illustrated embodiment, a variable displacement implement pump 92 supplies fluid by way of a high pressure supply line 124 to the steering circuit, including, for example, the two front steering motors 33a and 33b, and rear steering motor 33c by way of a flow divider 130 to front and rear steering valve 128. The flow divider maintains the same fluid flow to each motor so that they rotate at the same rate for coordinated steering. The motors 33a, 33b and 33c are preferably electrically synchronized and normally centered to a center null position for straight ahead operation. This is accomplished through the electrical interface.

The system similarly supplies fluid from pump 92 through line 135a to table or support platform leveling circuit, including valves 134, 136 and 138 which respectively control leveling jacks 140, 142 and 144, which operate to level the support platform of the vehicle relative to surrounding terrain. These valves are controlled by a leveling circuit comprising a slope sensor 141 that senses the slope of the vehicle frame about a longitudinal axis and a transverse axis and activates a control system 143 that actuates one or more of the valves until the platform is level. The slope sensor may be of the type sold by Sunstrand Corporation as the 134847A Slope Sensor and shown in Bulletin 95-8912-1 incorporated herein by reference.

The leveling control system for the vehicle includes a slope sensor 141 which is zeroed for zero slope such that as the vehicle tilts, a signal is generated proportionate to the degree of tilt from the reference. This signal is transmitted via the circuit to the control valves which operate the tilt or leveling of the vehicle relative to the terrain. The vehicle tilt system is activated and tilts the platform to a level condition for slopes up to about thirty degrees, for example. Additional tilting of the vehicle beyond this level or degree results in the vehicle platform being tilted with the vehicle until the vehicle has reached its maximum slope capability at about forty five degrees.

The vehicle is preferably controlled by remote control, such as by way of a radio telementary package, including the hydraulic mechanical interface as shown in FIG. 9. State of the art control systems are available, such as for example from RMS Industrial Controls, Inc. Such units are available with a hand control controller for controlling the vehicle throttle, steering, braking and implement controls. The operator 2 of the vehicle (FIG. 1) has in his possession a transmitter 16 that transmits selective signals to a receiver 62 on the vehicle that is connected by electrical control lines as schematically illustrated to the hydraulic system of the vehicle. Electrical signals from the receiver on the vehicle transmit electrical signals to electric motors or solenoids which operate the various hydraulic valves, etc. on the vehicle for controlling the various functions.

Figure 10:
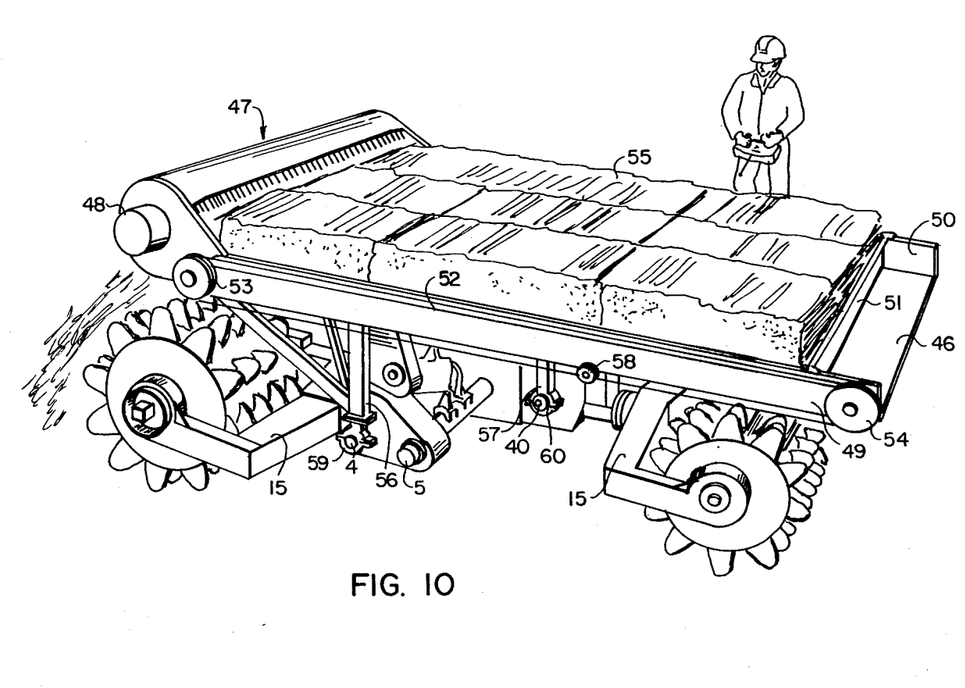
FIG. 10 is a view like FIG. 1 showing the vehicle equipped with a straw spreader.

Referring now to FIG. 10, an exemplary application of the vehicle will be described with use of a particular attachment for the vehicle. As shown in FIG. 10, the vehicle is designed to carry out various operations, and in the illustrated embodiment is carrying out an operation that is distributing straw or the like in front of the vehicle such that the lugs of the wheels of the vehicle will force or press the straw into the soil. Such distribution and application of straw to soil is a technique for erosion control. The straw forced into the soil assists in preventing soil erosion.

In the illustrated embodiment, a straw spreader comprises a platform or bed 46 forming a generally flat platform for supporting of bales or straw or hay 55 for feeding into a spreader 47 at the front of the vehicle. The support platform includes side walls 49 and 50 with a sliding gate 51 that is driven such as by means of cables 52 forward for advancing the bales of hay into the spreader 47. The cables 52 are passed over sheaves or pulleys 53 and 54 and are driven by means of a drive cone 58 that is driven by a hydraulic motor 48 or the like. As the bales of hay or straw are advanced forward, they engage the spreader, which comprises a rotating drum driven by a hydraulic motor 48 from the implement circuit of the vehicle, included radial teeth or fingers for ripping the bales apart and throwing the straw forward of the vehicle. The spreader drum is preferably covered on the top by a sheet metal or the like housing, as illustrated.

The hay or straw spreader is supported on the main frame of the vehicle by means of struts 56 and 57 that extend downward and are secured such as by detachable clamps to shafts 4 and 40 on the main frame of the vehicle. Other suitable means of support may be available. The spreader is secured to the main frame of the vehicle and will be level therewith.

Figures 11, 12, 13:
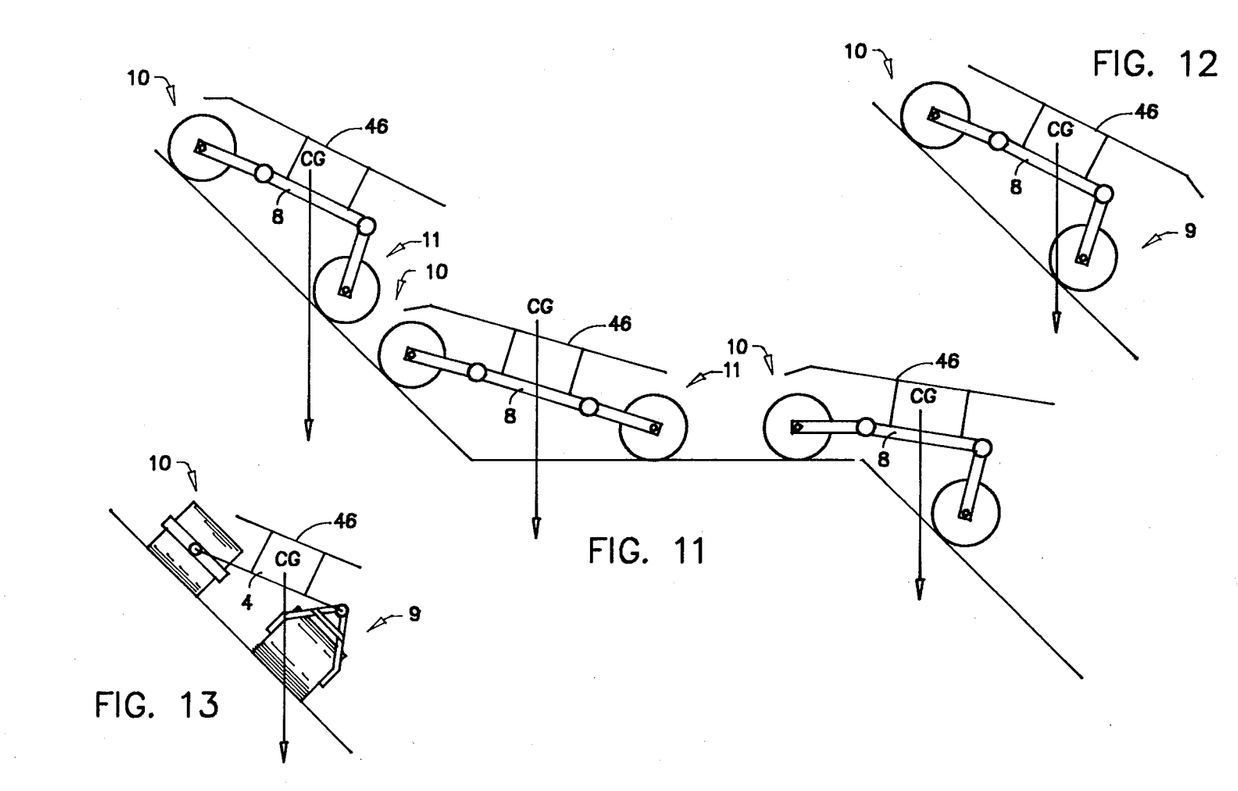
FIG. 11 is a diagrammatic illustration of the vehicle of FIG. 1 climbing a series of slopes.
FIG. 12 is a view like FIG. 11 showing the vehicle descending a slope.
FIG. 13 is a diagrammatic view of the vehicle traversing a slope.

Referring to FIGS. 11–13 of the drawings, there is illustrated an example of the vehicle just described climbing, descending and traversing a slope.

Referring first to FIG. 11, a vehicle designated generally by the numeral 1 somewhat similar to the vehicle just described, comprises a central frame 8 with a front wheel assembly 10, including a wheel and a fork or yoke connected at the joint to the main frame 8, as previously described. Similarly, a rear wheel assembly 11 includes a wheel connected by a yoke and joint to the frame 8. A platform 46 is supported on the central frame 8 of the vehicle. The vehicle is shown climbing a changing slope from right to left in FIG. 11 with the front wheel assembly 10 substantially level with the main frame 8 and the rear wheel assembly lowered to elevate the frame to substantially level the platform 46 as shown. As the vehicle continues up the slope, the main frame 66 of the vehicle and the load platform 74 will remain substantially level by operation of the slope sensing and leveling control system by operation of the elevating jacks that operate the rear wheel assembly.

The vehicle will, upon traversing from the first slope to the level surface, lower the vehicle frame to a position substantially level with the wheels, as shown by the vehicle in position 2.

As the front wheel assembly 10 of the vehicle engages the next slope and proceeds up the slope, the rear wheel assembly 11 will again begin to operate to elevate the vehicle frame, as shown in position 3. However, due to the steepness of the slope, the frame and support platform 46 will be elevated to its maximum, yet will not reach the level condition. This arrangement, as can be seen, will aid in controlling the center of gravity of the vehicle and its load and enhance the stability of the vehicle.

Referring to FIG. 12 as the vehicle descends the slope, the front wheel assembly 9 will be raised and the rear wheel assembly 10 will be lowered by its elevating mechanism as illustrated to bring the frame of the vehicle to a position as near level as possible. The slope, as seen in FIG. 22, exceeds the leveling capability of the machine, thus the machine and the support platform and will attain as near level condition as is within the capability of the machine.

Referring to FIG. 13, the machine is shown traversing a slope. Assuming for the purposes of illustration that the vehicle as illustrated is going away from the observer, the front wheel assembly 10 is positioned up slope from the wheel assembly 9, with the elevating unit of the front wheel assembly 9 activated and that of wheel assembly 10 not activated. The elevating assembly of the rear wheel 71 is activated, which raises the frame of the vehicle such that it is at a substantially level condition.

Figures 14, 15, 16:
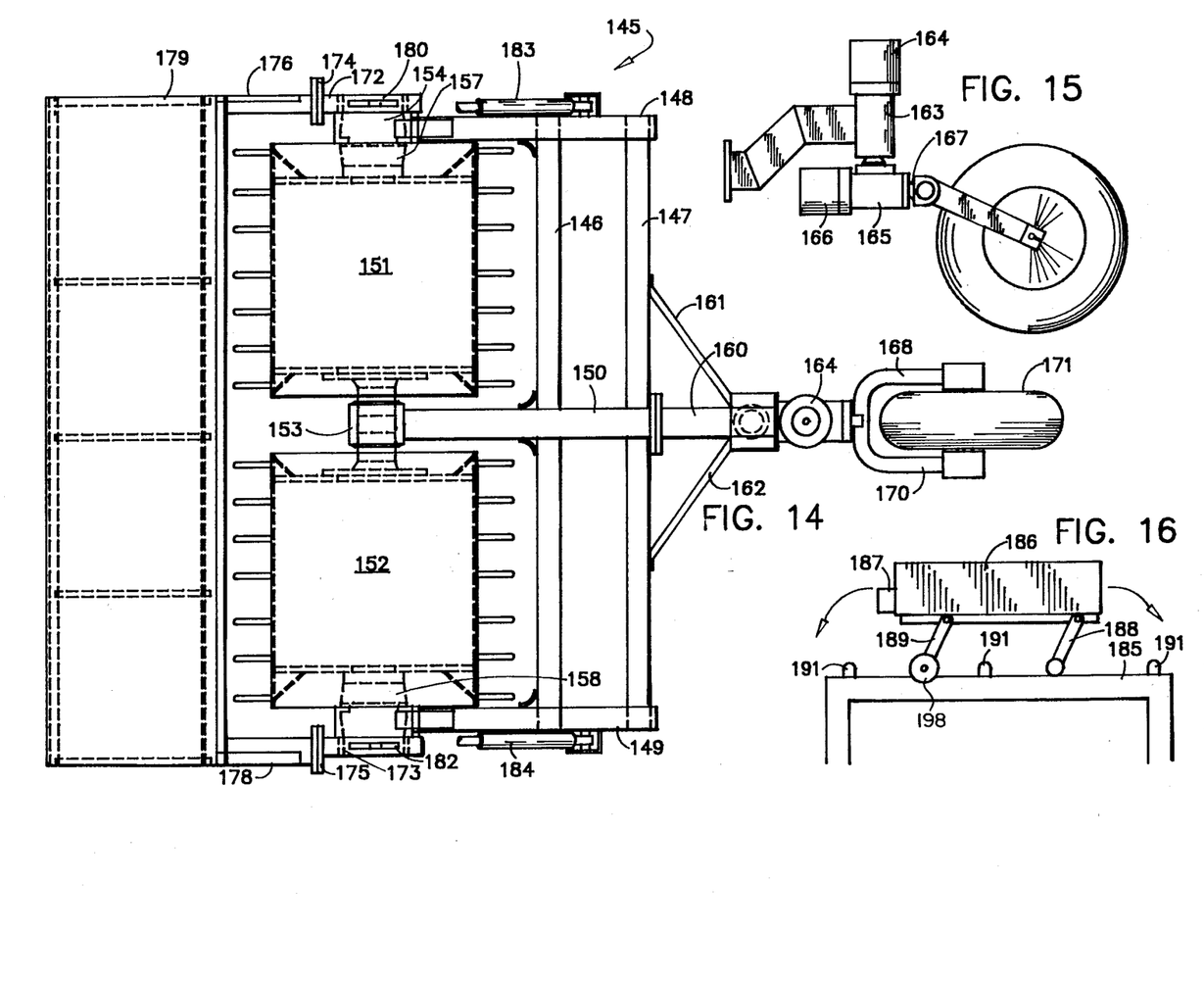
FIG. 14 is a top plan view of an alternate embodiment of the invention.
FIG. 15 is a side elevation view of a wheel unit for the embodiment of FIG. 14.
FIG. 16 is a top plan view of a mower attachment for the vehicle of FIG. 14.

Referring to FIGS. 14 and 15, an alternate embodiment of the vehicle is illustrated. The vehicle designated generally by the numeral 145 comprises a central main frame comprising a pair of transverse beam members 146 and 147 connected at the ends to forwardly extending end beam members 148 and 149. A central beam member 150 is secured between the members 146 and 147 and similarly extends forward for mountin the main wheels of the vehicles. The side beams 148 and 149 and the central beam 150 form the yoke assemblies.

A pair of wheels or rollers 151 and 152 are each journaled at an in board side in a journal or bearing 153 mounted on the beam 150. The wheels are each journaled at the outboard end or side in the beams 148 and 149 and are driven by hydraulic motors 154 and 156 through reduction gear units 157 and 158 as in the previous embodiment.

An engine and hydraulic, not shown, similar to that of the previous embodiment will be mounted on the central frame and connected substantially as described in the previous embodiment.

A rear end steerable wheel assembly includes or comprises a frame having a detachable beam 160 with side braces or arms 161 and 162 detachably securable to the beam 147 of the main frame of the vehicle. The wheel frame extends rearward and includes a steering assembly, as previously described with respect to the prior embodiment, comprising a king pin assembly 163 with a steering motor 164 coupled to the king pin, which is connected to a horizontally extending swivel unit 165, which itself is connected to a rotary hydraulic motor 166 for tilting the rear steering wheel as will be explained.

The wheel assembly includes a yoke comprising a central shaft 167, which is rotatably journaled in the swivel unit 165 and drivingly connected to the motor 166, and includes arms 168 and 170, which extend downward and rotatably mount a rubber tired wheel 171. The wheel may take other forms such as a steel wheel with a sharp guiding edge as is known in the implement art.

The vehicle includes an engine and hydraulic system, substantially as in the previous embodiment, with a slope sensing circuit particularly for pivoting the rear wheel unit about the longitudinal axis, which in the preferred embodiment acts to operate motor 166 for maintaining the wheel 171 in the vertical plane. This is for traversing slopes which enables the wheel to aid in controlling the direction of stability of the vehicle.

The steering of the vehicle is accomplished, as in the previous embodiments, by operation of the steering motor 164, which swivels the rear wheel about the steering axis of the king unit 163. Self steering (e.g. casters) rear wheels can be used and steering accomplished by differential power to wheels 151 and 152.

Also illustrated on the vehicle is a load carrying implement mounted on a pair of implement support arms 172 and 173, which are rotatably mounted on cylindrical journals at the forward end of the beams 148 and 149 coaxial of the rotary axis of the wheels 152 and 151. The arms 172 and 173 extend forward and include coupling means 174 and 175 to which is detachably attached a pair of arms 176 and 178 of a load carrying platform 179. The implement arms 172 and 173 include vertically extending levers or arms 180 and 182 to which is coupled a pair of hydraulic jacks or cylinders 183 and 184, which are operated by the control system of the vehicle for raising and lowering the load carrying platform 179.

Referring to FIG. 16, an alternate implement in the form of a weed and brush mower is illustrated. This implement includes a frame 185 which is detachably attachable to the implement arms 172 and 173 and includes a mower 186 of the flailing chain or hammer type driven by a hydraulic motor 187. The mower is supported forward on the beam 185 by a pair of pivoting arms 188 and 189, such that the mower may pivot or swivel from side to side by means of a hydraulic motor 190 to cover a swathe that exceeds the width of the mower 186 by an amount substantially equal to twice the length of the swing arms or links 188 and 189. The mower 186 is of the type available from Bomford Company, known as Model No. 120L.

Figure 17:
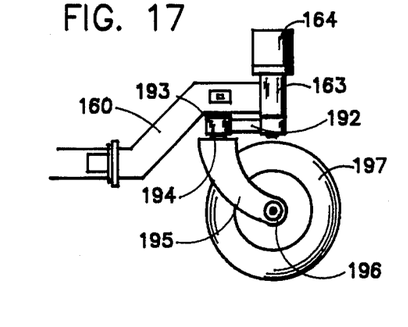
FIG. 17 is a side elevation view of an alternate embodiment of a wheel unit for the embodiment of FIG. 14.

Referring to FIG. 17, an alternate steering wheel for the FIG. 14 vehicle embodiment is illustrated. This wheel assembly includes a frame assembly, as in the previous embodiment, with a king pin 163 and motor 164.

This embodiment comprises an arm 192 which is secured at one end to the steering king pin and extends forward and includes a journal 193 in which a caster wheel unit, including a swivel shaft 194, is journaled. The caster wheel includes curved arms 195, which extend downward and sweep in an offset position to position a rotary axis 196 of a wheel 197 directly below the steering axis of the king pin unit 163. With this arrangement, a caster wheel can be utilized which enables the vehicle to be operated with steering being controlled by variable drive of the front wheels and the rear wheel to caster to accommodate steering of the unit. With this however, the motor 164 may be utilized to pre-rotate the caster to the proper direction to follow the vehicle. This reduces the normal load that would be forced on the caster as it turns at the end of a pass or the like. For example the vehicle can be equipped with a seat and manual controls so that an operator can ride and operate the vehicle. Also the vehicle can be equipped with video cameras for even more remote operation out of the sight of the operator. The machine can, for example, be used for remote operation in mining tunnels or the like.

Other uses and operations of the machine will be obvious. The vehicle can be equipped with guns, rockets, and other hardware including cameras for military use. It can also be used for forrest fire and other fire fighting uses.

While we have illustrated and described our invention by means of specific embodiments, it is to be understood that numerous changes and modifications may be made therein without departing from the spirit and scope of the invention as defined in the appended claims.

We claims:

1. A multi-axis all terrain vehicle comprising, in combination:
   a frame having a front end and a rear end and a longitudinally extending central axis;
   a pair of front wheel assemblies each including a rotatably mounted wheel;
   means for mounting said front wheel assemblies on said frame front end in laterally spaced relationship on opposite sides of said central axis;
   said front wheel assemblies mounting means arranged to permit each of said front wheel assemblies to pivot independently on a vertical steering axis, to pivot independently on a transverse horizontal axie and to rotate independently on an axis parallel to said frame central axis for rocking when traversing a hill;
   a rear wheel assembly including a rotatably mounted wheel;
   means for mounting said rear wheel assembly on said frame rear end on said central axis;
   said rear wheel mounting means arranged to permit said rear wheel assembly to pivot on a vertical axis, to pivot on a transverse horizontal axis and to rotate on an axis corresponding to said frame central axis for rocking when traversing a hill;
   said wheels having an axial length sufficient for supporting said frame in an upright orientation; and
   means for driving at least one of said wheels.

2. A vehicle according to claim 1 wherein:
   said means for driving said one of said wheels comprises an engine for powering said vehicle; and,
   a hydraulic system driven by said engine including hydraulic motor means for driving said wheels and hydraulic power means for pivoting said rear wheel assembly about said transverse horizontal axis.

3. A vehicle according to claim 2 wherein:
   said two front wheels are and,
   said vehicle has a single rear wheel and said wheel is greater in length than diameter and said wheel is steerable.

4. A vehicle according to claim 3 comprising:
   throttle control means responsive to a throttle control signal for controlling the speed of said engine;
   transmission control means responsive to a transmission control signal for controlling said transmission;
   steering control means responsive to a steering control signal for controlling steering of said vehicle;
   implement control means responsive to an implement control signal for controlling an implement on said vehicle; remote control means for said vehicle comprising a radio transmitter having means for transmitting a throttle control signal, a transmission control signal, a steering control signal, and an implement control signal; and, a receiver on said vehicle for receiving said signals and transmitting said signals the respective control means.

5. A remote controlled motor vehicle for traversing rough terrain, said vehicle comprising:

a frame having a front end and a rear end and a longitudinally extending central axis;

a pair of front wheel assemblies each including a rotatably mounted wheel;

means for mounting said front wheel assemblies on said frame front end in laterally spaced relationship on opposite sides of said central axis;

said front wheel assemblies mounting means arranged to permit each of said front wheel assemblies to pivot independently on a vertical steering axis to pivot independently on transverse horizontal axis and to rotate independently on an axis parallel to said frame central axis for rocking when traversing a hill;

a rear wheel assembly including a rotatably mounted wheel;

means for mounting said rear wheel assembly on said frame rear end on said central axis;

said rear wheel mounting means arranged to permit said rear wheel assembly to pivot on a vertical axis, to pivot on a transverse horizontal axis and to rotate on an axis corresponding to said frame central axis for rocking when traversing a hill;

said wheels having an axial length sufficient for supporting said frame in an upright orientation;

an engine mounted on said chassis for powering said vehicle;

transmission means drivingly connecting said engine to at least one of said front and rear wheels; and, remote control means for remotely controlling said vehicle.

6. A motor vehicle according to claim 5 wherein:
at least one of said front and rear wheels has an axial length exceeding the diameter thereof.

7. A motor vehicle according to claim 6 wherein:
said transmission means is a hydrostatic drive system.

8. A motor vehicle according to claim 7 wherein:
said front wheel has an axial length greater than the diameter; and,
said rear wheel is a single wheel and is mounted for steering about a vertical axis and for pivoting about a longitudinal axis for maintaining a vertical position.

9. A vehicle according to claim 8 wherein:
said wheel assemblies include a fork for mounting each of said wheels; and,
said forks are pivotally mounted for limited pivotal movement relative to said frame.

10. A vehicle according to claim 9 wherein:
said forks pivot about longitudinal-axes relative to said frame.

11. A vehicle according to claim 10 comprising:
a hydraulic system driven by said engine including hydraulic motor means for driving said wheels and hydraulic power means for pivoting said forks about said transverse axes.

12. A vehicle according to claim 10 comprising:
throttle control means responsive to a throttle control signal for controlling the speed of said engine;
transmission control means responsive to a transmission control signal for controlling said transmission;
steering control means responsive to a steering control signal for controlling steering of said vehicle;
implement control means responsive to an implement control signal for controlling an implement on said vehicle; remote control means for said vehicle comprising a radio transmitter having means for transmitting a throttle control signal, a transmission control signal;
a steering control signal, and an implement control signal; and,
a receiver on said vehicle for receiving said signals and transmitting said signals to the respective control means
throttle control means responsive to a throttle control signal for controlling the speed of said engine;
transmission control means responsive to a transmission control signal for controlling said transmission; and
steering control means responsive to a steering control signal for steering at least one of said front and rear wheels.

13. A remote controlled motor vehicle for traversing rough terrain, said vehicle comprising:

a frame having a front end and a rear end and a longitudinally extending central axis;

a pair of front wheel assemblies each including a rotatably mounted wheel;

means for mounting said front wheel assemblies on said frame front end in laterally spaced relationship on opposite sides of said central axis;

said front wheel assemblies mounting means arranged to permit each of said front wheel assemblies to pivot independently on a vertical steering axis, to pivot independently on a transverse horizontal axis and to rotate independently on an axis parallel to said frame central axis for rocking when traversing a hill;

a rear wheel assembly including a rotatably mounted wheel;

means for mounting said rear wheel assembly on said frame rear end on said central axis;

said rear wheel mounting means arranged to permit said rear wheel assembly to pivot on a vertical axis, to pivot on a transverse horizontal axis and to route on an axis corresponding to said frame central axis for rocking when traversing a hill;

said wheels having an axial length sufficient for supporting said frame in an upright orientation;

hydrostatic drive means powered by said engine at least one of said front and said rear wheels;

an engine mounted on said chassis for powering said vehicle;

steering control means responsive to a steering control signal for steering at least one of said front and rear wheels;

implement control means responsive to an implement control signal for controlling an implement on said vehicle;

remote control means for said vehicle comprising a wireless transmitter having means for transmitting a throttle control signal, a transmission control signal, a steering control signal, and an implement control signal; and a wireless receiver on said vehicle for receiving said control signals and transmitting said signals to the respective control means.

14. A motor vehicle according to claim 1 comprising:

slope sensing means for sensing a tilt of said vehicle frame; and control means for pivoting said forks about said axis transverse to the longitudinal axis for maintaining the frame in the level condition.

15. A remote controlled motor vehicle according to claim 5 comprising:

slope sensing means for sensing a tilt of said vehicle frame about a transverse axis; and control means responsive to said slope sensing means for pivoting said one of said wheel assemblies about a horizontal axis transverse to the longitudinal axis for maintaining the frame in the level condition.

16. A remote controlled motor vehicle according to claim 13 comprising:

slope sensing means for sensing a tilt of said vehicle chassis about a transverse axis; and control means responsive to said slope sensing means for pivoting said one of said wheel assemblies about said horizontal axis transverse to the longitudinal axis for maintaining the chassis substantially in the level condition when climbing and descending a slope.

* * * * *

UNITED STATES PATENT AND TRADEMARK OFFICE
CERTIFICATE OF CORRECTION

PATENT NO. : 4,714,140

DATED : December 22, 1987

INVENTOR(S) : JOHN H. HATTON and GREGORY L. BATT

It is certified that error appears in the above-identified patent and that said Letters Patent is hereby corrected as shown below:

IN THE SPECIFICATION
    Column 10, line 10, delete "claims" and insert therefor --claim--.

IN THE CLAIMS
    Claim 1, line 23, delete "axie", and insert therefor --axis--.
    Claim 3, line 48, after "are", insert --each greater in length than diameter--.

Signed and Sealed this

Seventeenth Day of May, 1988

Attest:

DONALD J. QUIGG

Attesting Officer    Commissioner of Patents and Trademarks